E. E. HAUER.
MOTOR.
APPLICATION FILED JULY 26, 1913.

1,167,995.

Patented Jan. 11, 1916.
2 SHEETS—SHEET 1.

Witnesses
Grover Ilgen
Floyd McKean

Inventor
Elmer E. Hauer
By Percy Norton
Attorney

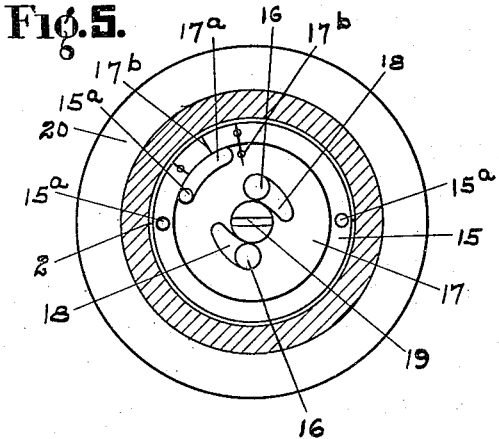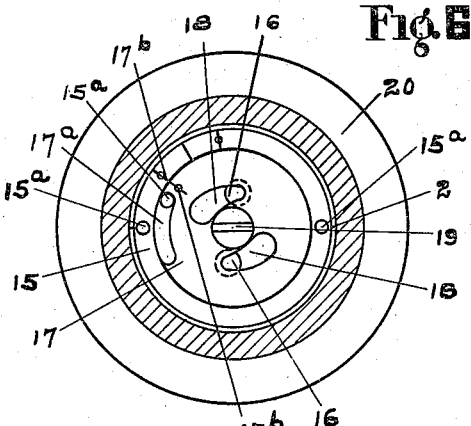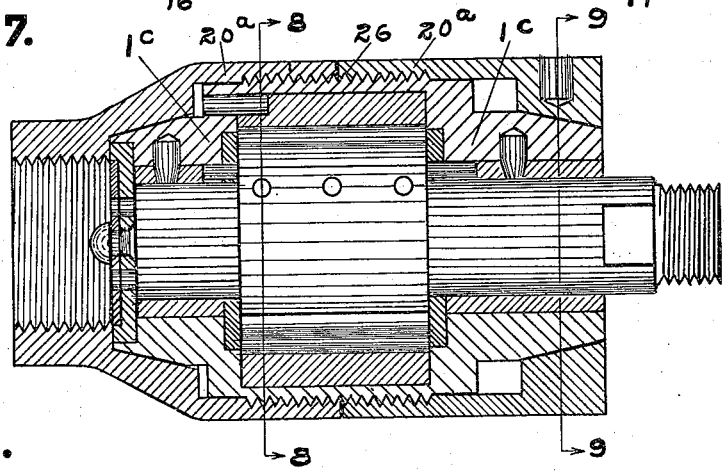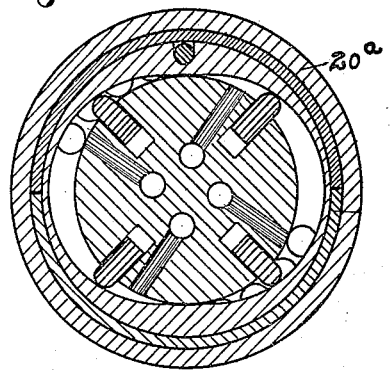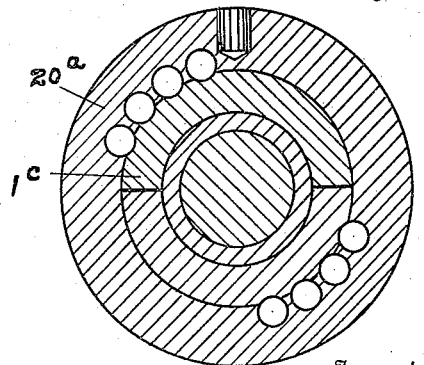

UNITED STATES PATENT OFFICE.

ELMER E. HAUER, OF SPRINGFIELD, OHIO, ASSIGNOR TO THE LAGONDA MANUFACTURING COMPANY, OF SPRINGFIELD, OHIO, A CORPORATION OF OHIO.

MOTOR.

1,167,995.  Specification of Letters Patent.  Patented Jan. 11, 1916.

Application filed July 26, 1913. Serial No. 781,418.

*To all whom it may concern:*

Be it known that I, ELMER E. HAUER, a citizen of the United States, residing at Springfield, in the county of Clark and State of Ohio, have invented certain new and useful Improvements in Motors, of which the following is a specification, reference being had therein to the accompanying drawings.

My invention relates to motors and more particularly to motors for driving boiler tube cleaners that are adapted to travel through a tube with the cleaner although they may be used for other purposes.

The object of my invention is to provide simple, strong and efficient motors that will withstand the hard usage incident to the particular service for which they are designed and so arranged that they can be easily assembled and readily taken apart.

With these and other objects in view my invention consists of the constructions and combinations hereinafter described and set forth in the claims.

Figure 1:
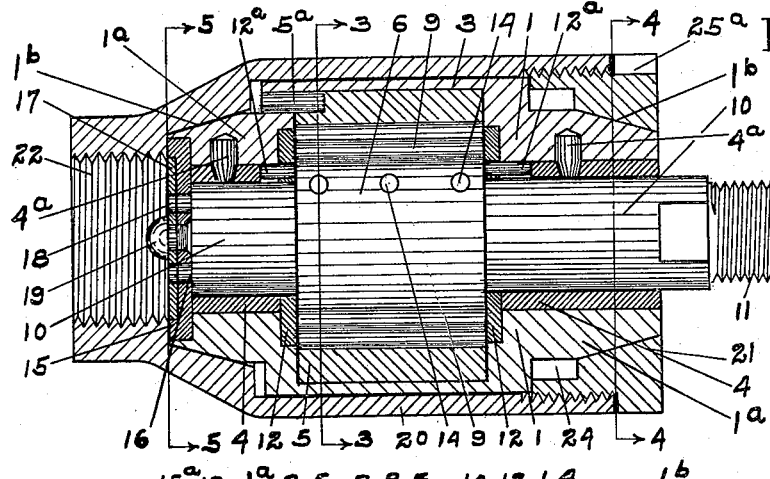
Figure 2:
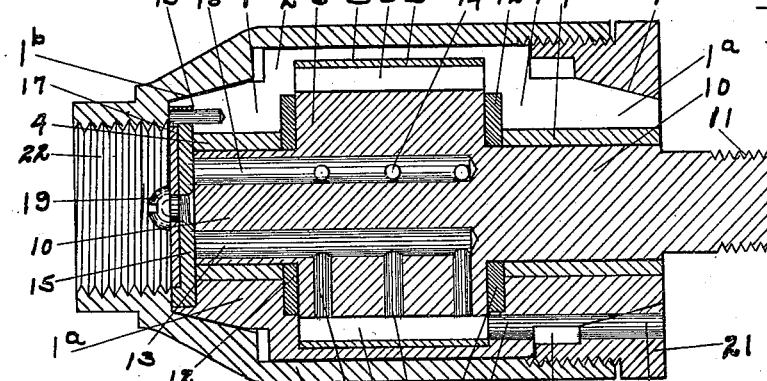
Figure 3:
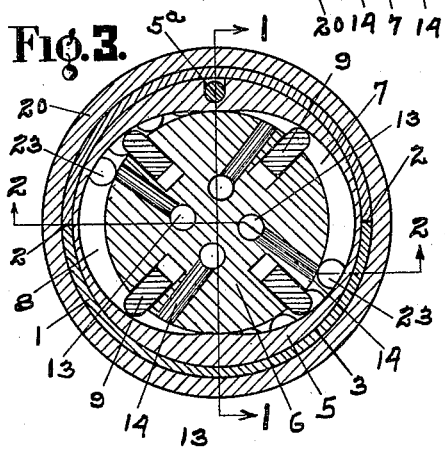
Figure 4:
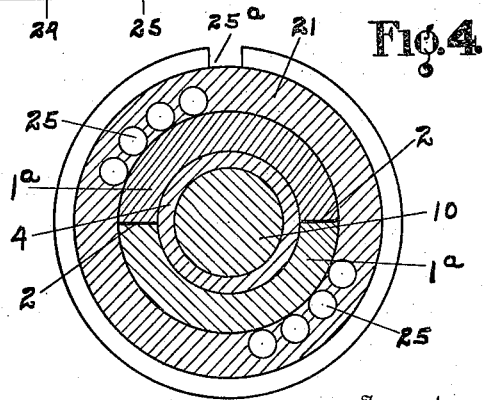

In the accompanying drawings which form a part of this specification Figure 1 is a longitudinal section on the line 1—1 of Fig. 3 showing one form of motor embodying my invention; Fig. 2 is a like section on the line 2—2 of Fig. 3; Fig. 3 is a cross-section on the line 3—3 of Fig. 1; Fig. 4 is a cross-section on the line 4—4 of Fig. 1; Figs. 5 and 6 are cross-sections on the line 5—5 of Fig. 1, Fig. 5 showing ported plate at the limit of its throw in one direction and Fig. 6 the limit of its throw in the opposite direction; Fig. 7 is a longitudinal section of a modification; Fig. 8 is a cross-section on the line 8—8 of Fig. 7 and Fig. 9 is a cross-section on the line 9—9 of Fig. 7.

Like numerals represent the same parts in the several views.

Now referring to the form of motor shown in Figs. 1 to 6 inclusive 1 represents a holding member which may be divided into any number of parts, but is shown as split preferably in the direction of its length at 2 into two parts and has a chamber 3 therein with oppositely disposed end walls $1^a$ forming bearings in which removable bushings 4 are preferably employed, and said bushings are held against rotation by dowel-pins $4^a$.

A motor cylinder 5 is seated within the chamber 3 and is secured against rotation by a dowel-pin $5^a$. In the present instance I have shown the motor cylinder forming a chamber of such dimensions that when the rotary motor member 6 is mounted therein it will contact with the walls of the chamber in two places opposite each other forming two oppositely disposed chambers 7 and 8 as particularly shown in Fig. 3. Piston blades 9 are seated in recesses of the rotary motor member and are adapted to move radially into the chambers 7 and 8 in a well known manner.

The rotary motor member 6 is provided with a shaft 10 extending forwardly and rearwardly therefrom and preferably formed integrally therewith as shown. Said shaft is journaled in the bearings formed in or carried by the end portions $1^a$ of the holding member. The forwardly extending portion of the shaft projects through the holding member and is screw-threaded at 11 to attach a tube cleaner or other tool to be driven. Wearing plates 12 are shown seated in recesses formed in the holding member on opposite sides of the rotary motor member and said plates are held against rotation by dowel-pins $12^a$.

Inlet ports 13 extend through the rearwardly extending portion of the shaft 10 into the body of the rotary motor member and intersect cross-ports 14 which open into the working chambers in the rear of the piston blades.

A plate 15 seated in a recess at the rear end of the holding member and abutting the rear end of the shaft 10 is provided with ports 16 adapted to register with the ports 13 of the rotary motor member. Said plate is held against rotation by a dowel-pin $15^a$. Another plate 17 seated in a recess formed in the plate 15 is provided with ports 18 of greater width at one end than the other as particularly shown in Figs. 5 and 6. In Fig. 5 the ports 18 of the plate 17 are adjusted to the circular ports 16 of the plate 15 to admit the greatest possible quantity of the motive agent, and in Fig. 6 the adjustment is for the minimum quantity and of course the adjustment can be made at any point between the maximum and minimum. When the adjustment has been made to suit the conditions of the service in which the motor is employed the plate 17 is tightened in place by a set-screw 19. The plate 17 is further provided with a peripheral recess $17^a$ and a pin $15^a$ fixed in the plate 15 and projecting into said recess forms a stop for the plate 17. The hole in the plate 15 for the set-screw 19 is beveled at its inner end, and said set-screw has its inner end enlarged to engage the bevel of said opening so that while said set-screw can be loosened to admit of the ported plate 17 being turned, the arrangement is such that the plate 17 is secured to the plate 15 and cannot be lost therefrom. Furthermore the plates 15 and 17 have graduating marks 17$^b$ oppositely disposed on the respective plates so that the operator can readily adjust the admission of the motive agent to the quantity desired.

The respective ends 1$^a$ of the holding member are tapered or inclined as shown at 1$^b$ and a casing 20 having as a part thereof a securing ring or plug 21 screw-threaded thereto is provided for said holding member, said casing and ring having inclined inner walls to engage the inclined walls 1$^b$ of the holding member, the arrangement being such that by screwing the ring 21 to the casing tightens the holding member in its assembled position within the casing. The casing is provided at its rear end with a screw-threaded opening 22 for attaching a supply conduit and exhaust ports 23 lead from the working chambers through the front end of the holding member into an annular chamber 24 formed between said holding member and securing ring and thence through ports 25 in said securing ring. The recess 25$^a$ in the ring 21 is for the engagement of a spanner wrench.

This motor is assembled by first placing the wear plates and bushings on the shaft; then inserting the piston blades in the recesses of the rotary motor member; then inserting the parts so assembled in the motor cylinder; then placing all of said parts within the holding member; then placing the ported plates in position and inserting all into the casing through the front end and securing it therein by attaching the securing ring.

The motor shown in Figs. 7, 8 and 9 is similar to the one shown in Figs. 1 to 6 inclusive and heretofore described with this modification that the casing 20$^a$ is made in two parts having outer ends to engage the respective ends of the holding member 1$^c$ and screw-threaded at their inner ends at 26 to the holding member.

It will be seen that the holding member carries the bearings at the respective ends thereof and gives a very rigid construction to withstand the lateral strains which are very great in the particular service for which the motor is designed; and further these bearings being within the holding member can be bored in perfect alinement at one operation.

Various modifications in the details of construction may be made without departing from the principle of my invention and I do not wish to be understood as limiting myself to the precise details hereinbefore described and shown in the drawings.

My co-pending application Serial Number 27,199, filed May 10, 1915, which is a division hereof, covers constructions in which a holding member separable by being split in the direction of its length is specifically claimed.

Having thus described my invention I claim:—

1. In a rotary motor, a motor cylinder, a split holding member having a chamber in which said cylinder is seated and means adapted to engage and secure said holding member in assembled position, substantially as described.

2. In a rotary motor, a motor cylinder, a split holding member having end bearings with an intermediate chamber in which said cylinder is seated and means adapted to engage and secure said holding member in assembled position, substantially as described.

3. In a rotary motor, a motor cylinder, a split holding member having a chamber and end bearings with removable bushings therein, said cylinder being seated in said chamber and means adapted to engage and secure said holding member in assembled position, substantially as described.

4. In a rotary motor, a motor cylinder, a split holding member having a chamber therein, means to hold said cylinder against rotation within said chamber and means adapted to engage and secure said holding member in assembled position, substantially as described.

5. In a rotary motor, a motor cylinder, a split holding member having a chamber therein, means to hold said cylinder against rotation in said chamber and a casing for said holding member, substantially as described.

6. In a rotary motor, a motor cylinder, a split holding member having end bearings and an intermediate chamber, said cylinder being seated in said chamber and a casing for said holding member, substantially as described.

7. In a rotary motor, a motor cylinder, a split holding member having a chamber and end bearings with removable bushings therein, said cylinder being seated in said chamber and a casing for said holding member, substantially as described.

8. In a rotary motor, a motor cylinder, a split holding member having end bearings and an intermediate chamber, said cylinder being seated in said chamber and a casing adapted to clamp said holding member, substantially as described.

9. In a rotary motor, a motor cylinder, a split holding member having a chamber and end bearings with removable bushings, means to secure said cylinder against rotation within said chamber and a casing adapted to clamp said holding member, substantially as described.

10. In a rotary motor, a motor cylinder, a split holding member having a chamber and end bearings with removable bushings, means to secure said bushings against rotation, said cylinder being secured against rotation within said chamber and a casing for said holding member adapted to clamp said member, substantially as described.

11. In a rotary motor, a motor cylinder, a split holding member having a chamber in which said cylinder is disposed and a casing for said holding member, substantially as described.

12. In a rotary motor, a motor cylinder, a split holding member having end bearings and an intermediate chamber, said cylinder being disposed within said chamber and a casing for said holding member, substantially as described.

13. In a rotary motor, a motor cylinder, a split holding member having end bearings and an intermediate chamber in which said cylinder is disposed, said holding member being tapered at its respective ends, a casing having an open end through which said holding member is inserted and a removable closure secured to the open end of said casing and adapted to tighten said holding member in place, substantially as described.

14. In a rotary motor, a motor cylinder, a split holding member having a chamber and end bearings, said motor cylinder being seated in said chamber, a wearing plate seated in said holding member at an end of said cylinder and a casing for said holding member, substantially as described.

15. In a rotary motor, two ported plates, one of which is adjustable in its relation to the other to enlarge or decrease the admission of the motive agent, means to fix said adjustable plate in its adjusted position, said means being arranged to permanently secure said plates together, substantially as described.

In testimony whereof I have hereunto affixed my signature in the presence of two witnesses.

ELMER E. HAUER.

Witnesses:
OLIVER H. HAUSE,
FLOYD McKEAN.

Copies of this patent may be obtained for five cents each, by addressing the "Commissioner of Patents, Washington, D. C."